United States Patent [19]
Tonn, Jr.

[11] Patent Number: 5,821,798
[45] Date of Patent: Oct. 13, 1998

[54] METHOD FOR DETERMINING WHETHER BI-DIRECTIONAL OR UNIDIRECTIONAL DATA LINE CIRCUITS ARE USED

[75] Inventor: Donald L. Tonn, Jr., San Jose, Calif.

[73] Assignee: Adaptec, Inc., Milpitas, Calif.

[21] Appl. No.: 709,501

[22] Filed: Sep. 6, 1996

[51] Int. Cl.[6] ..................................................... H03L 5/00
[52] U.S. Cl. ........................... 327/333; 327/18; 327/603; 326/30; 326/82
[58] Field of Search ................................ 327/333, 18, 19, 327/603; 326/30, 82, 86, 90

[56] References Cited

U.S. PATENT DOCUMENTS

| | | | |
|---|---|---|---|
| 4,166,963 | 9/1979 | Metcalf | 326/30 |
| 4,471,243 | 9/1984 | Isham | 326/86 |
| 5,581,201 | 12/1996 | Sonner et al. | 327/333 |

*Primary Examiner*—Kenneth B. Wells
*Attorney, Agent, or Firm*—Skjerven, Morrill, MacPherson, Franklin & Friel, LLP; Edward C. Kwok

[57] ABSTRACT

To increase compatibility, a method is used to determine whether a bidirectional or a unidirectional data line circuit is connected to an interface circuit. A first logic level is generated on a non dedicated lead of the interface circuit if a bidirectional data line circuit is connected to the interface circuit. Otherwise, a second logic level is generated on the non dedicated lead of the interface circuit. The logic level on the non dedicated lead after a reset signal determines which type of data line circuit is connected to the interface circuit. Typically the non dedicated lead is a data line lead of the interface circuit and can be used for normal data transfer, if necessary, after detecting which type of data line circuit is connected to the interface circuit.

10 Claims, 5 Drawing Sheets

METHOD FOR DETERMINING WHETHER BI-DIRECTIONAL OR UNIDIRECTIONAL DATA LINE CIRCUITS ARE USED

BACKGROUND OF THE INVENTION

1. Field of the Invention

The present invention relates to distinguishing between different data line types for digital systems, and more particularly to determining if a connected circuit uses bidirectional or unidirectional data lines.

2. Description of The Related Art

In recent years, the density of integrated circuits (ICs) has increased exponentially. Therefore integrated circuits of increasing complexity can be formed on shrinking die sizes. However, IC packaging technology has been unable to keep pace with IC fabrication technology.

In particular, the number of pins on an IC package is increasingly becoming a limiting factor on the amount of integration capable on a singe IC package. One technique for IC designers to increase the density of an IC package is to use bidirectional input/output data pins instead of separate unidirectional input and output pins. For example on DRAM chips arranged to be one bit wide, a separate input pin and a separate output pin is provided. However for DRAM chips arranged to be four bits wide, separate unidirectional input and output pins are not feasible resulting in the use of four bidirectional input/output pins. Another example can be found for electrically erasable programmable read only memories (EEPROMs), where some EEPROMs use bidirectional data pins while others use pairs of unidirectional data pins.

However, the alternate use of bidirectional and unidirectional data lines on similar ICs present system designers, as well as, chip designers with the problem of having to support both kinds of ICs in their designs to insure compatibility with as many parts as possible. For example, a SCSI interface chip may need to access software stored on an EEPROM to function properly. Depending on the amount of memory required for the software different EEPROMS may be used. The different EEPROM types may have different data line types. The IC designer does not know the requirements of the software until after the SCSI interface using the SCSI interface chip is built and debugged. Therefore, the IC designer must be able to support both data line types and the associated control lines of the different EEPROMs.

The key to supporting both types of ICs is to distinguish between the two types when the system is reset. Conventionally, a chip designer would use an extra pin on the chip to provide a signal to the chip about what type of data line circuit is connected to the chip. For example, the pin could be grounded for bidirectional data lines and pulled high for unidirectional data lines.

The major problem with conventional methods and circuits for distinguishing between different type of data lines is that they require additional pins. As explained above, the number of pins available on an IC package is becoming a major limitation on the level of integration available on the IC. Therefore, what is needed is a method and circuit to distinguish between bidirectional and unidirectional data lines without requiring additional pins.

SUMMARY

In accordance with the present invention a method is disclosed to determine whether a bidirectional data line circuit or a unidirectional data line circuit is attached to an interface circuit without using additional pins of the interface circuit. A first logic level is generated on a non dedicated pin of the interface circuit if a unidirectional data line circuit is used. Otherwise, a second logic level is generated on the non-dedicated pin. The interface circuit reads the level on the non dedicated pin during a reset to determine whether bidirectional or unidirectional data lines are used.

DETAILED DESCRIPTION

According to the principles of this invention, a first circuit determines whether a second circuit, that is connected to the first circuit, has a bidirectional or a unidirectional data line without requiring extra pins to signal the data line type to the first circuit. The present invention uses a non-dedicated pin which is already required for other purposes to signal the data line type to the first circuit during reset.

Figure 1A:
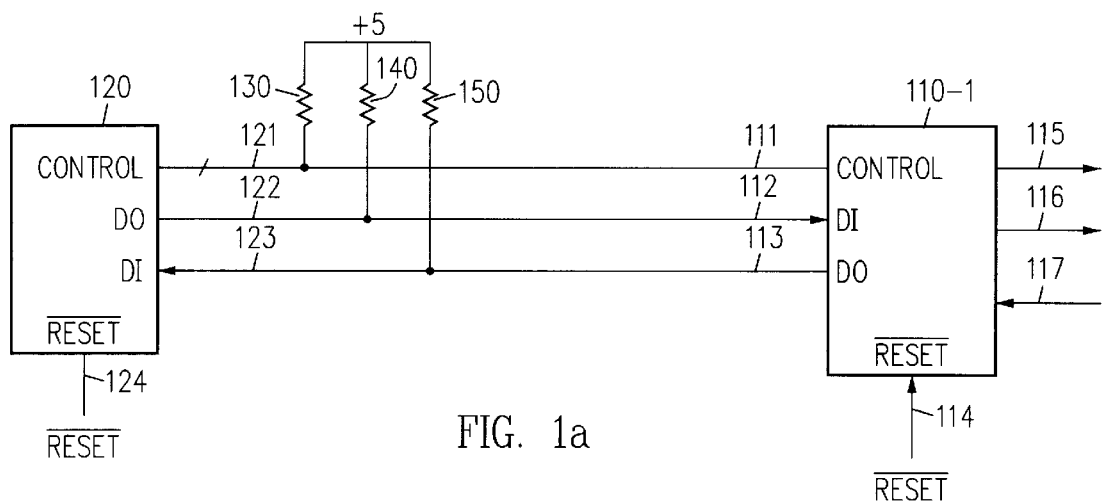
FIGS. 1(a) and 1(b) show one embodiment of the invention to determine whether a bidirectional or a unidirectional data line circuit is used.

FIG. 1(a) illustrate one embodiment of this invention for connections between an interface circuit 110-1 and unidirectional circuit 120. Control pins 111, data input pin 112 and data output pin 113 of interface circuit 110-1 are connected to control pins 121, data output pin 122 and data input pin 123, respectively, of unidirectional circuit 120. Internal data in output terminal 115 provides the incoming data to other circuits. Internal data line type output terminal 116 provides the data line type to other circuits. Internal data out input terminal 117 receives the outgoing data from other circuits. In this embodiment, data flows from pin 113 to pin 123 and also from pin 122 to pin 112. Reset pin 124 of unidirectional circuit 120 and reset pin 114 of interface circuit 110-1 are connected to the same reset signal source. As used herein, reset should be read as not reset, which refers to an active low reset signal. Herein, reference to a circuit as "unidirectional" means that the data pins are not bidirectional pins. Since interface circuit 110-1 functions with both unidirectional and bidirectional data lines, at least one of data input pin 112 and data output pin 113 is capable of functioning as a bidirectional input/output pin. The naming scheme is used for clarity with respect to their function when attached to unidirectional data lines.

Interface circuit 110-1 and unidirectional circuit 120 can each be either on a single chip, or an assembly of multiple components. Furthermore, interface circuit 110-1 and unidirectional circuit 120 can have multiple pairs of data input pins and data output pins. However, only one set of data input and data output pins for unidirectional circuit 120 with the corresponding one data input/output pin of interface circuit 110-1 is shown for clarity.

Pull-up resistor 130 represents a separate resistor connected between the positive supply voltage and each of control pins 111. Pull-up resistor 140 is connected to data input pin 112 and pull-up resistor 150 is connected to data output pin 113. The various resistors can be incorporated with the interface circuit on a single chip.

Upon receiving the $\overline{\text{reset}}$ signal on $\overline{\text{reset}}$ pin 114, interface circuit 110-1 monitors the state of the signal on data input pin 112 to determine what type of data line is connected. In the embodiment of FIG. 1(a), a logic high signal on data input pin 112 while the $\overline{\text{reset}}$ signal is active signifies unidirectional data lines and a logic low signal while the $\overline{\text{reset}}$ signal is active signifies bidirectional data lines.

Unidirectional circuit 120 should either output a logic high on data output pin 122 or place data output pin 122 into a high impedance state in which case pull-up resistor 140 provides a logic high signal for data input pin 112. Alternatively, unidirectional circuit 120 can use either an open drain circuit, or an open collector circuit which always relies on an external pull-up such as pull-up resistor 140 to provide a logic high signal. If unidirectional circuit 120 is only capable of outputting a logic low upon reset, the embodiment in FIG. 3(a) as described below should be used.

Figure 1B:
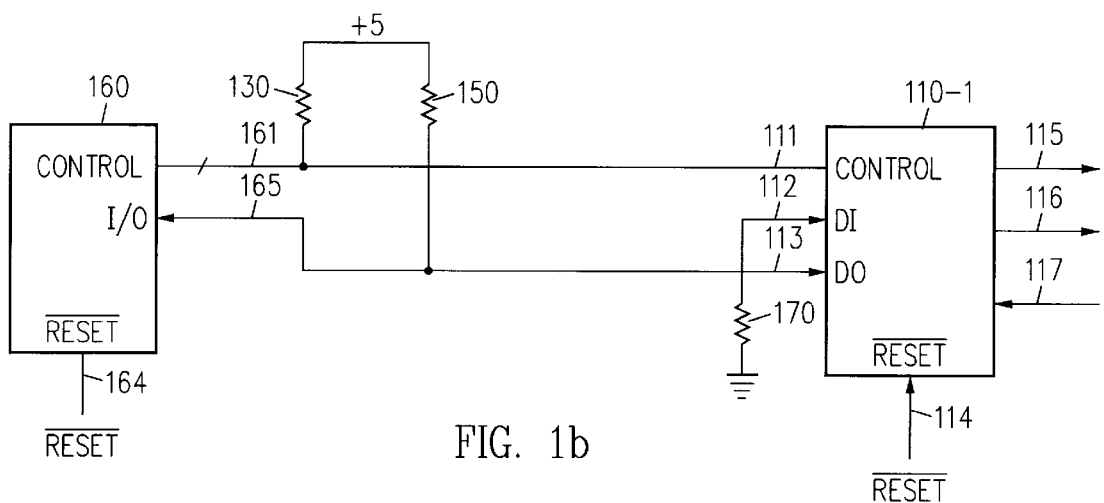

FIG. 1(b) is similar to FIG. 1(a) except unidirectional circuit 120 has been replaced by a bidirectional circuit 160 that has control pins 161, a data input/output pin 165, and a $\overline{\text{reset}}$ pin 164. Again, while bidirectional circuit 160 can have multiple data input/output pins, only one is shown for clarity.

In this embodiment, control pins 111 of interface circuit 110-1 are connected to control pins 161 of bidirectional circuit 160. Data input/output pin 165 of bidirectional circuit 160 is connected to data output pin 113 of interface circuit 110-1. Data input pin 112 of interface circuit 110-1 is connected to ground through resistor 170 to provide a logic low signal on data input pin 112. Pull-up resistor 130 represents a separate resistor connected between the positive supply voltage and each of control pins 111. Pull-up resistor 150 is connected to data output pin 113.

Since data input/output pin 165 is bidirectional, data input pin 112 is held low. Therefore, upon the $\overline{\text{reset}}$ signal on $\overline{\text{reset}}$ pin 114 going active, interface circuit 110-1 senses the low signal and determines that a bidirectional signal line is necessary and so utilizes data output pin 113 as a bidirectional input/output pin.

Figure 2A:
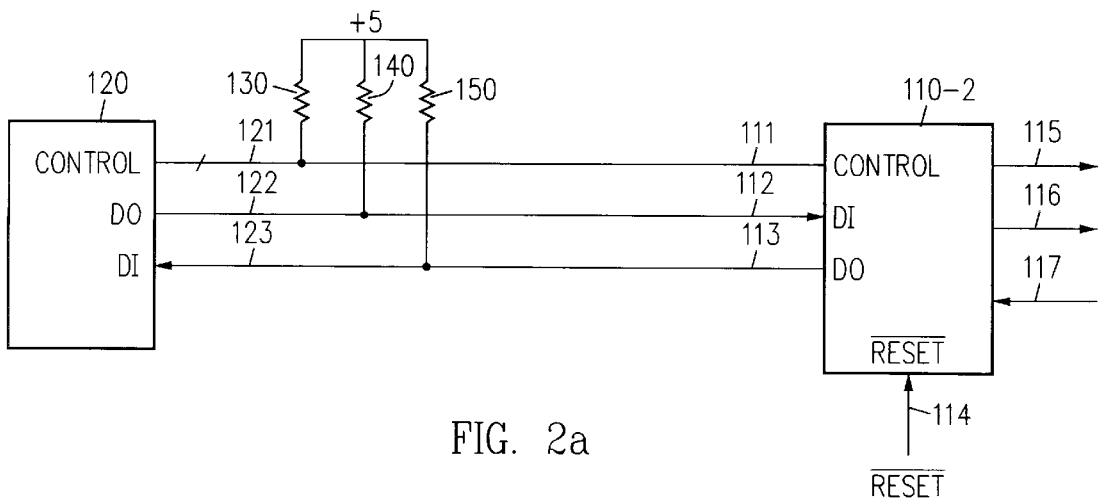
FIGS. 2(a) and 2(b) show another embodiment of the invention to determine whether a bidirectional or a unidirectional data line circuit is used.
Figure 2B:
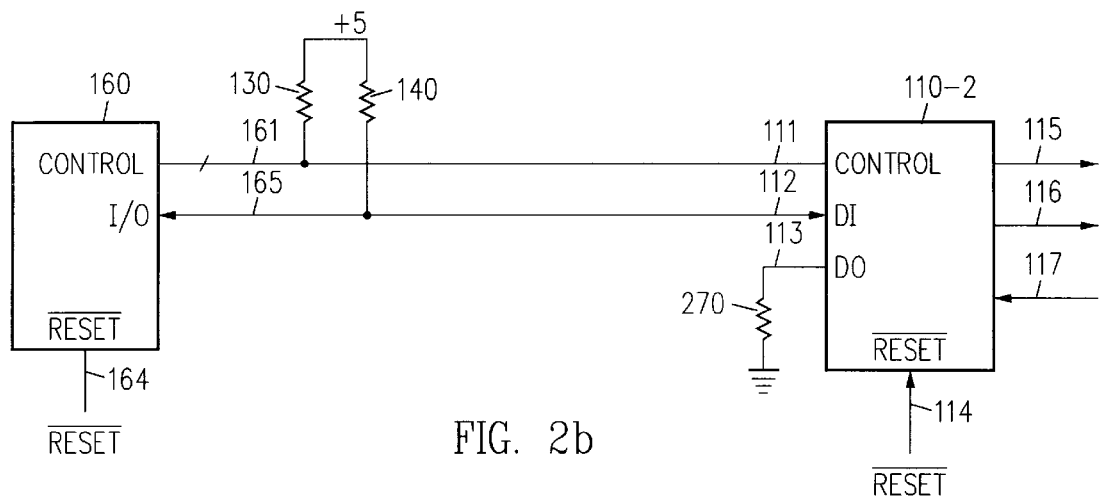

FIGS. 2(a) and 2(b) show an embodiment of the invention which uses data output pin 113 to monitor the data line type. FIG. 2(a) show the connections between interface circuit 110-2 and unidirectional circuit 120 to implement this embodiment of the invention. Since the connections are identical to FIG. 1(a), the description is not repeated.

Upon receiving the reset signal, interface circuit 110-2 monitors the state of the signal on data output pin 113 to determine what type of data line is connected. In the embodiment of FIGS. 2(a) and 2(b) during a reset, a logic high signal on data output pin 113 signifies unidirectional data lines while a logic low signal signifies bidirectional data lines.

If unidirectional data lines are used with the embodiment of FIGS. 2(a) and 2(b), data output pin 113 is used as an input pin during reset and does not output a signal. Furthermore, data output pin 113 is connected to data input pin 123, which only receives data and does not drive the line between the pins. Therefore, during a reset, a logic high signal is provided to data output pin 113 via pull-up resistor 150 when unidirectional circuit 120 is connected to interface circuit 110-2.

FIG. 2(b) show the connections between unidirectional circuit 160 and interface circuit 110-2 to implement this embodiment of the invention. Control pins 111 of interface circuit 110-2 are connected to control pins 161 of bidirectional circuit 160. Data input/output pin 165 of bidirectional circuit 160 is connected to data input pin 112 of interface circuit 110-2. Data output pin 113 of interface circuit 110-2 is connected to ground through resistor 270. Pull-up resistor 130 represents a separate resistor connected between the positive supply voltage and each of the control pins 111. Pull-up resistor 140 is connected to data input pin 112. As shown in FIG. 2(b), when bidirectional circuit 160 is used, data output pin 113 is connected to ground through resistor 270 to provide a logic low signal. In this embodiment, data input pin 112 is used as an input/output pin.

Figure 3A:
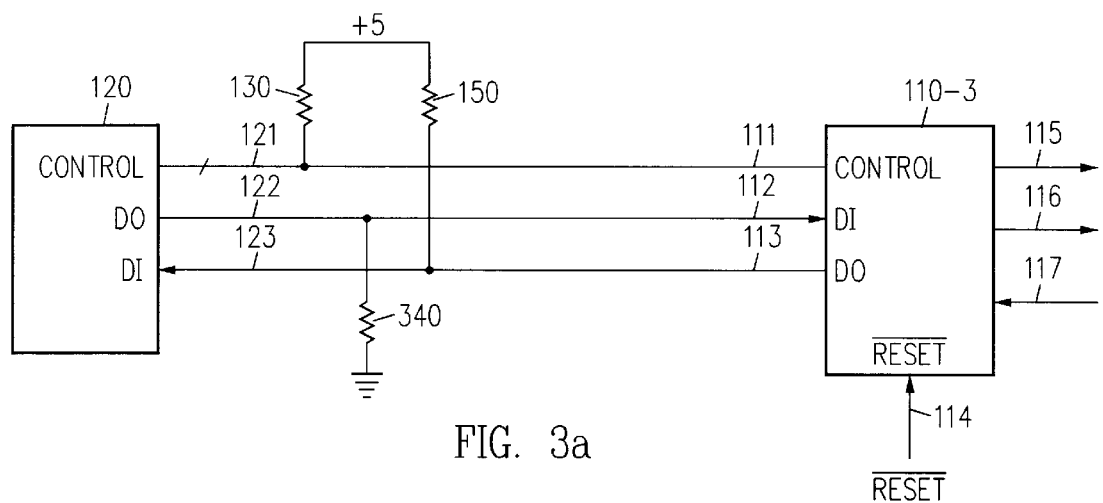
FIGS. 3(a) and 3(b) show another embodiment of the invention to determine whether a bidirectional or a unidirectional data line circuit is used.

FIG. 3(a) show the connections between an interface circuit 110-3 and unidirectional circuit 120 to implement a third embodiment of the invention. The interconnection of the pins of circuits 110-3 and 120 is identical to that discussed above with respect to FIG. 1(a) for interface circuit 110-1 and unidirectional circuit 120 with the exception that pull-up resistor 140 is not used. Rather, pull-down resistor 340 is connected between data input pin 112 and ground. Pull-down resistor 340 should be large enough, for example 10 KΩ, so that under normal operation data output pin 122 is capable of driving a logic high signal to data input pin 112.

Upon receiving the $\overline{\text{reset}}$ signal, interface circuit 110-3 monitors the state of the signal on data input pin 112 to determine what type of data line is connected. In the embodiment of FIG. 3(a) during a reset, a logic low on data input pin 112 signifies unidirectional data lines while a logic high signifies bidirectional data lines. Thus, interface circuit 110-1 is similar to circuit 110-3 except the polarity of the signal has been changed for indicating the type of connected circuit.

Unidirectional circuit 120 should either output a logic low signal on data output pin 122 or place data output 122 into a high impedance state in which case a logic low signal is driven on data input pin 112 via pull-down resistor 340. If unidirectional circuit 120 is only capable of outputting a logic high upon reset, the embodiment in FIG. 1(a) as described above should be used.

Figure 3B:
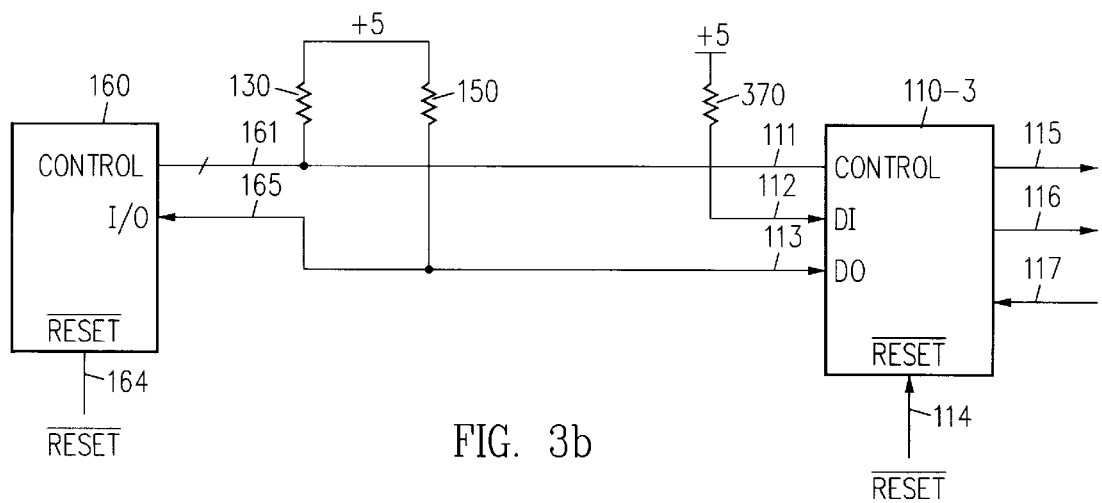

FIG. 3(b) show the connections between bidirectional circuit 160 and interface circuit 110-3 to implement the third embodiment of the invention. The connections for control pins 111, control pins 161, input/output pin 165, and data output pin 113 are the same as described above for interface circuit 110-1 and bidirectional circuit 160 in FIG. 1(b). However, in this embodiment, data input pin 112 of interface circuit 110-3 is connected to the positive supply voltage through pull-up resistor 370 and so a logic high signal is on data input pin 112. Consequently, upon reset, circuit 110-3 senses that data output pin 113 is connected to a bidirectional circuit.

Figure 4A:
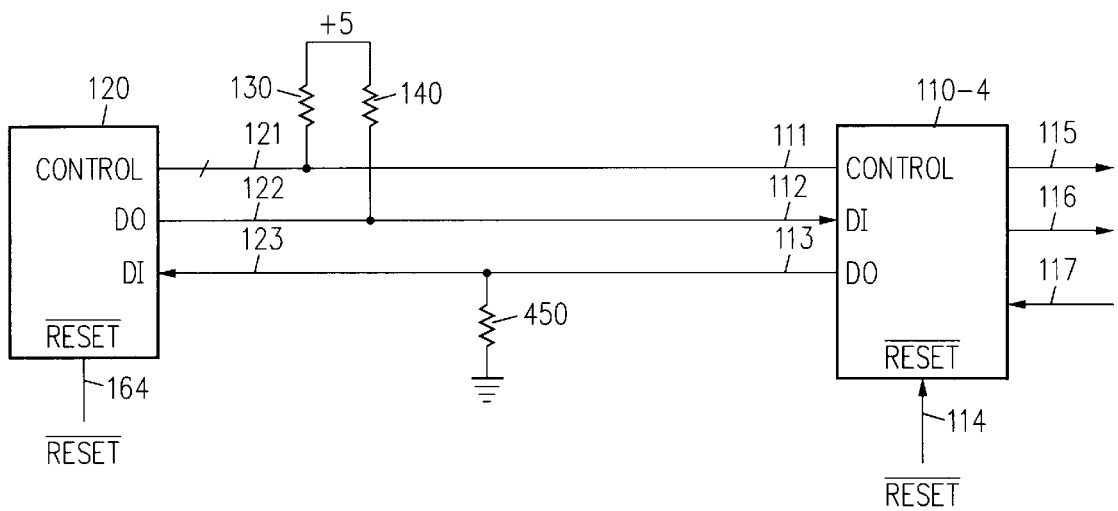
FIGS. 4(a) and 4(b) show another embodiment of the invention to determine whether a bidirectional or a unidirectional data line circuit is used.

FIG. 4(a) show a fourth embodiment of the invention which uses data output pin 113 of interface circuit 110-4 to monitor the data line type. The interconnection of the pins of interface circuits 110-4 and unidirectional circuit 120 is identical to that discussed above with respect to FIG. 2(a)

for interface circuit 110-2 and unidirectional circuit 120 with the exception that pull-up resistor 150 is not used. Rather, pull-down resistor 450 is connected between data output pin 113 and ground.

Figure 4B:
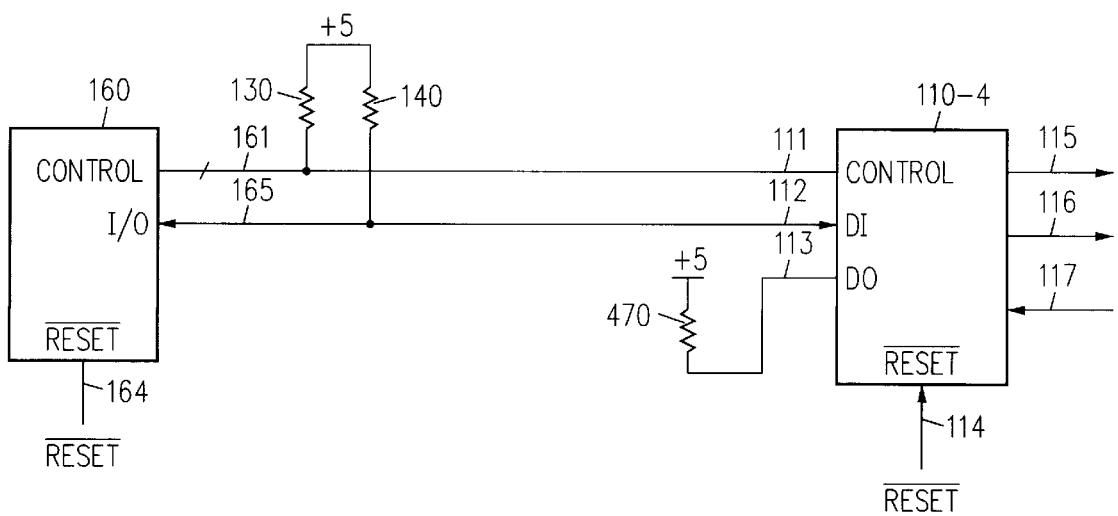

Pull-down resistor 450 should be large enough, for example 10 KΩ, so that under normal operation data output pin 113 is capable of driving a logic high signal to data input pin 123. Upon receiving the reset signal, interface circuit 110-4 monitors the state of data output pin 113 to determine what type of data line is connected. In the embodiment of FIGS. 4(a) and 4(b) during a reset, a logic low signal on data output pin 113 signifies unidirectional data lines while a logic high signal signifies bidirectional data lines.

If unidirectional circuit 120 is used with the embodiment of FIGS. 4(a) and 4(b), data output pin 113 is used as an input pin during reset and does not output a signal. Therefore, during a reset, a logic low signal is provided to data output pin 113 via pull-down resistor 450.

FIG. 4(b) show the connections between bidirectional circuit 160 and interface circuit 110-4 to implement this embodiment of the invention. Control pins 111 of interface circuit 110-4 are connected to control pins 161 of bidirectional circuit 160. Data input/output pin 165 of bidirectional circuit 160 is connected to data input pin 112 of interface circuit 110. Data output pin 113 of interface circuit 110 is connected to the positive supply voltage through pull-up resistor 470. Pull-up resistor 130 represents one resistor connected between the positive supply voltage and each of the control pins 111. Pull-up resistor 140 is connected to data input pin 112. As shown in FIG. 4(b), when bidirectional circuit 160 is used, data output pin 113 is connected to pull-up resistor 470 to provide a logic high signal.

Figure 5A:
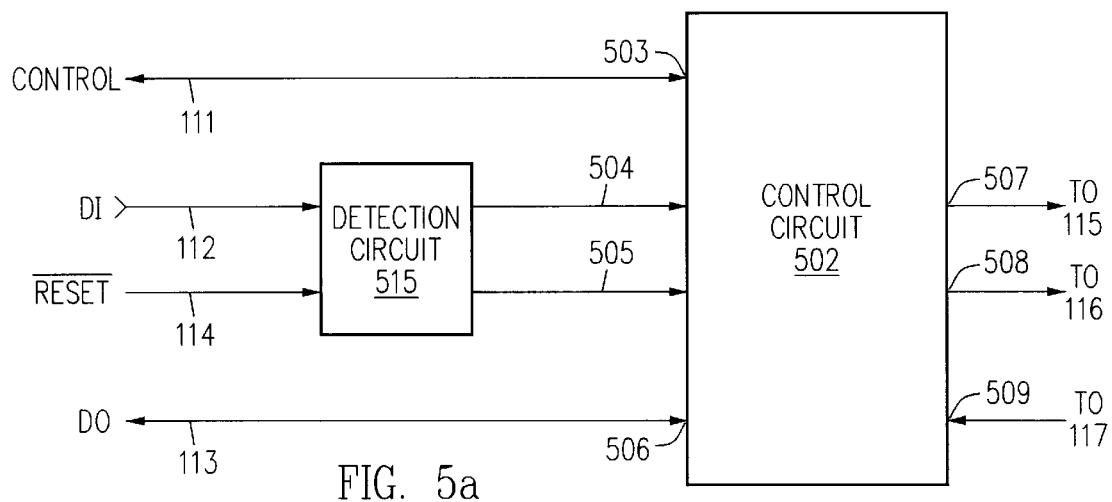
FIGS. 5(a) and 5(b) show a block diagram and a circuit which can be used to in conjunction with the invention to determine whether a bidirectional or a unidirectional data line circuit is used.

FIG. 5(a) is a block diagram of one implementation of interface circuit 110-1 or 110-3 for use with the embodiments of the invention illustrated in FIGS. 1(a) and 1(b), or 3(a) and 3(b). Detection circuit 515, which is coupled to data input pin 112 and reset pin 114, contains a storage element which stores the selection signal on data input pin 112 under the control of reset pin 114. The selection signal stored in the storage element of detection circuit 515 is provided as an internal selection signal to control circuit 502 and controls whether control circuit 502 is in unidirectional or bidirectional mode. Detection circuit 515 also provides the signal from data input pin 112 to control circuit 502.

Control circuit 502 generates control logic signals for either unidirectional circuit 120 or bidirectional circuit 160 on control leads 503, which are coupled to control pins 111. Control circuit 502 receives incoming data signals as well as the data line type from detection circuit 515 on data input lead 504 and data line type input lead 505. If the data line type signifies that control circuit 502 should be in unidirectional mode, control circuit 502 couples data input pin 112 to internal data in output terminal 115 and couples data output pin 113 to internal data out input terminal 117. If the data line type signifies that control circuit 502 should be in bidirectional mode control circuit 502 alternatively couples data output pin 113 to internal data in output terminal 115 or internal data out input terminal 117, depending on the direction of data transfer.

Figure 5B:
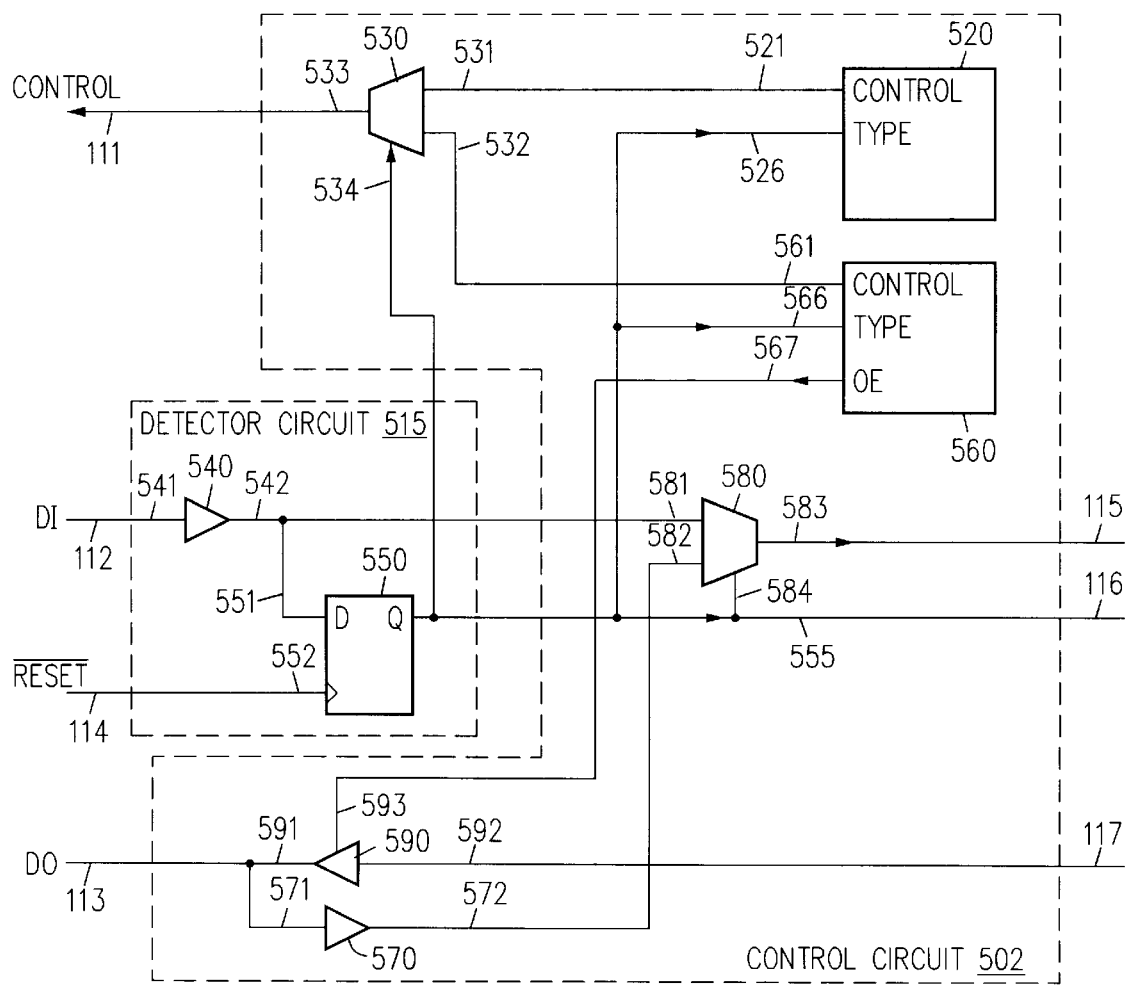

FIG. 5(b) is a circuit diagram of one implementation of interface circuit 110-1 or 110-3 for use with the embodiments of the invention illustrated in FIGS. 1(a) and 1(b), or 3(a) and 3(b). Unidirectional control circuit 520, which includes control leads 521, and data line type input lead 526, generates control logic signals for unidirectional circuit 120 on control leads 521. Similarly, bidirectional control circuit 560, which includes control leads 561, output enable output lead 567, and data line type input lead 566, generates control logic signals for bidirectional circuit 160 on control leads 561.

Each of control leads 521 is connected to a different input/output terminal in a first plurality of input/output terminals 531 of multiplexer/demultiplexer 530. Similarly, each of control leads 561 is connected to a different input/output terminal in a second plurality of input/output terminals 532 of multiplexer/demultiplexer 530. One of the first or second pluralities of input/output terminals 531, 532 is connected to control pins 111 by a signal on data line type signal line 555, that is connected to input select terminal 534 of multiplexer/demultiplexer 530, so that either unidirectional control circuit 520 or bidirectional control circuit 560 is coupled to control pins 111.

The particular operations performed by the control circuits are not essential to this invention. As is known to those of skill in the art, the operations depend on the type of circuit that is connected to interface circuit 110-1 or 110-3. The important aspect is that when the signal on data input lead 112 has a first state, signifying unidirectional mode, unidirectional control circuit 520 is enabled and bidirectional control circuit 530 is disabled. Conversely, when the signal on data input lead 112 has a second state, signifying bidirectional mode, unidirectional control circuit 520 is disabled and bidirectional control circuit 560 is enabled. Those of skill in the art will appreciate that in some embodiments, unidirectional control circuit 520 and bidirectional control circuit 560 could be implemented as a single circuit.

A signal on data input pin 112 is passed through input buffer 540 to data input terminal D of D-type flip-flop 550 and to input terminal 581 of multiplexer 580. The signal on reset pin 114 drives clock input terminal 552 of D-type flip-flop 550.

Thus, when the reset signal goes inactive, i.e., has an edge from an active state to an inactive state, the edge causes D-type flip-flop 550 to store the data line type selection signal on data input pin 112.

Consequently, the data line type selection signal on data input pin 112 when the reset signal was active is produced on data output terminal Q of D-type flip-flop 550 after the reset signal is inactive.

Data output terminal Q of D-type flip-flop 550 is connected to data line type signal line 555 which in turn is connected to input select terminal 534 of multiplexer/demultiplexer 530, data line type input lead 526, data line type input lead 566, and input select terminal 584 of multiplexer 580. Thus, the signal level on data line type signal line 555 selects either unidirectional control circuit 520 or bidirectional control circuit 560 and couples the selected circuit to control pins 111.

A second input terminal 582 of multiplexer 580 is coupled to data output pin 113 by buffer 572 so that a signal on data output pin 113 is applied to second input terminal 582. Thus, when the signal on data line type signal line 555 has the first state, signifying unidirectional mode, the signal on data input pin 112 is passed through multiplexer 580 to data in output terminal 115. Conversely, when the signal on data line type signal line 555 has the second state, signifying bidirectional mode, the signal on data output pin 113 is passed through multiplexer 580 to internal data in output terminal 115.

Internal data out input terminal 117 is connected to a three-state buffer 590 that in turn is connected to data output pin 113. Output enable input lead 593 of three-state buffer 590 is connected to output enable output lead 567. When the signal on data line type signal line 555 has the second state, signifying bidirectional mode, and if interface circuit 110-1 or 110-3 is writing to bidirectional circuit 160, three-state buffer 590 is enabled by bidirectional control circuit 560. When interface circuit 110 is reading from bidirectional circuit 160, three-state buffer 590 is disabled by bidirectional control circuit 560. When the signal on data line type signal line 555 has the first state, signifying unidirectional mode, bidirectional control circuit 560 enables output buffer 590 whether data is read into or written out of interface circuit 110.

Figure 6A:
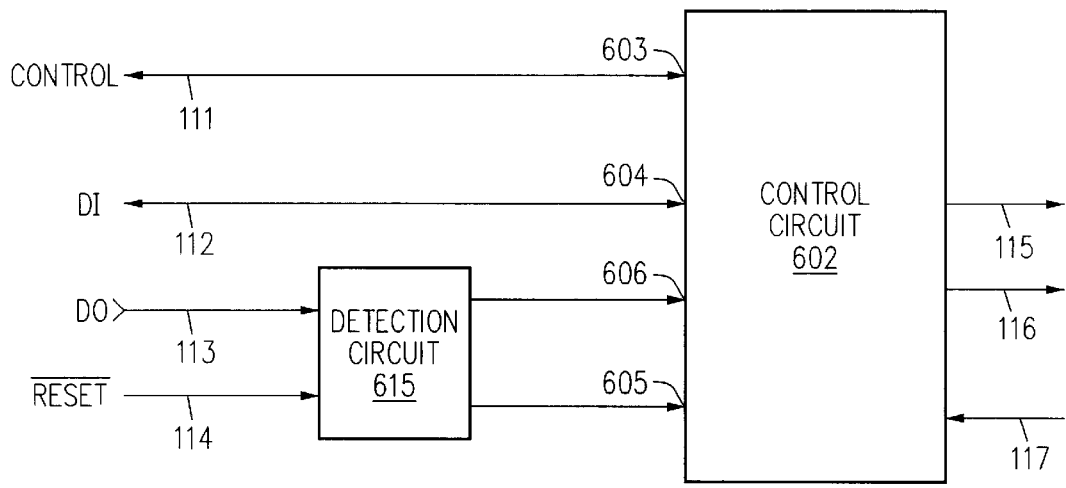
FIGS. 6(a) and 6(b) show another block diagram and circuit which can be used to in conjunction with the invention to determine whether a bidirectional or a unidirectional data line circuit is used.

FIG. 6(a) is a block diagram of one implementation of interface circuit 110 for use with the embodiments of the invention illustrated in FIGS. 2(a) and 2(b), or 4(a) and 4(b). Detection circuit 615, which is coupled to data output pin 113 and reset pin 114, contains a storage element which stores the selection signal on data output pin 113 under the control of reset pin 114. The selection signal stored in the storage element of detection circuit 615 is provided as an internal selection signal to control circuit 602 and controls whether control circuit 602 is in unidirectional or bidirectional mode. Detection circuit 615 also provides the signal from data output pin 113 to control circuit 602.

Control circuit 602 generates control logic signals for either unidirectional circuit 120 or bidirectional circuit 160 on control leads 603, which are coupled to control pins 111. Control circuit 602 receives the data line type from detection circuit 615 on data line type input lead 606. If the data line type signifies that control circuit 602 should be in unidirectional mode, control circuit 602 couples data input pin 112 to internal data in output terminal 115 and couples data output pin 113 to internal data out input terminal 117. If the data line type signifies that control circuit 602 should be in bidirectional mode, control circuit 602 alternatively couples data input pin 112 to internal data in output terminal 115 or internal data out input terminal 117 depending on the direction of data transfer.

Figure 6B:
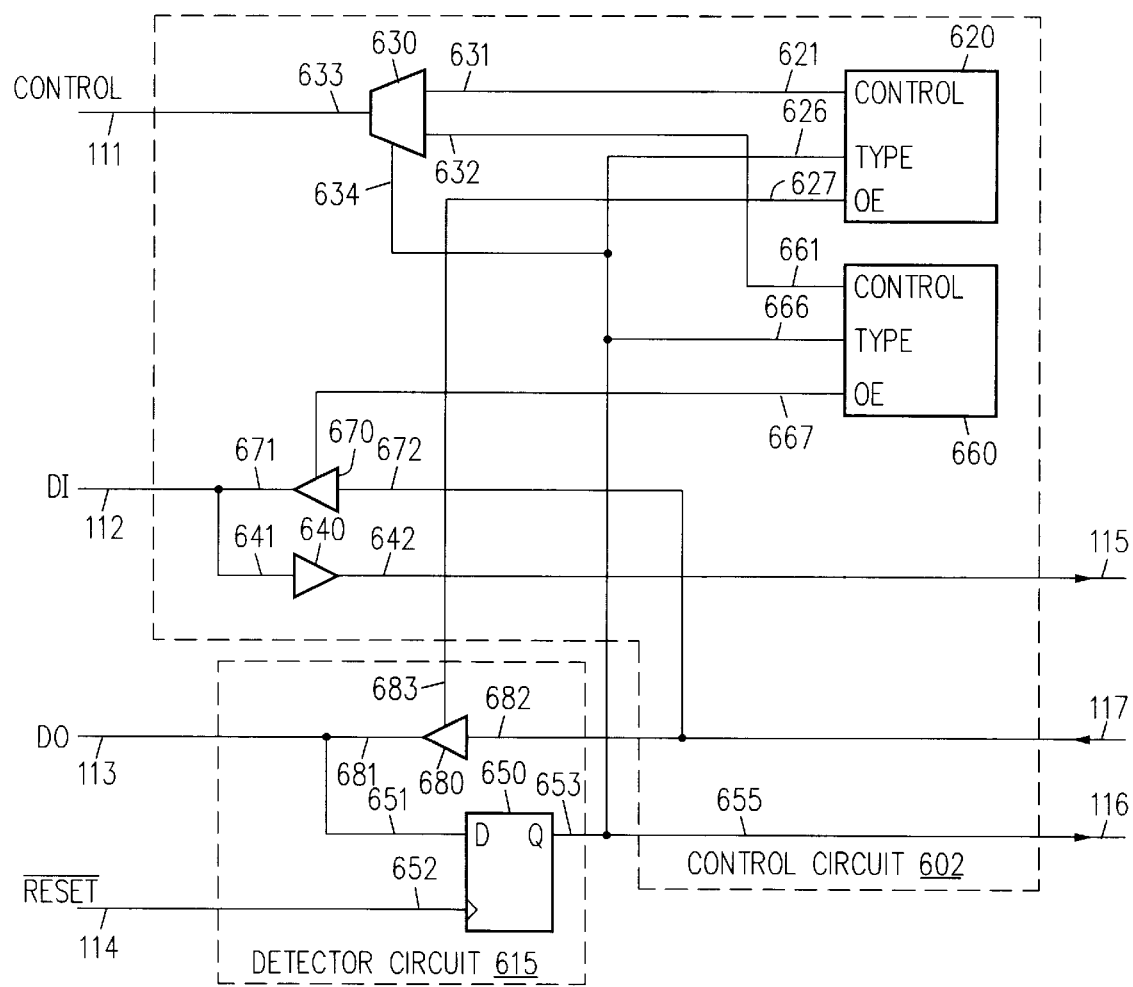

FIG. 6(b) is a circuit diagram of one implementation of interface circuit 110 for use with the embodiments of the invention illustrated in FIGS. 2(a) and 2(b), or 4(a) and 4(b). Unidirectional control circuit 620, which includes control leads 621, output enable output lead 627, and data line type input lead 626, generates control logic signals for unidirectional circuit 120 on control leads 621. Similarly, bidirectional control circuit 660, which includes control leads 661, output enable output lead 667, and data line type input lead 666, generates control logic signals for bidirectional circuit 160 on control leads 661.

Each of control leads 621 is connected to a different input/output terminal in a first plurality of input/output terminals 631 of multiplexer/demultiplexer 630. Similarly, each of control leads 661 is connected to a different input/output terminal in a second plurality of input/output terminals 632 of multiplexer/demultiplexer 630. One of the first or second pluralities of input/output terminals 631, 632 is connected to control pins 111 by a signal on circuit type signal line 655 that is connected to input select terminal 634 of multiplexer/demultiplexer 630 so that either unidirectional control circuit 620 or bidirectional control circuit 660 is coupled to control pins 111.

The particular operations performed by the control circuits are not an essential to this invention. As is known to those of skill in the art, the operations depend on the type of circuit that is connected to interface circuit 110. The important aspect is that when the signal on data output lead 113 has a first state, signifying unidirectional mode, unidirectional control circuit 620 is enabled and bidirectional control circuit 660 is disabled. Conversely, when the signal on data output lead 113 has a second state, signifying bidirectional mode, unidirectional control circuit 620 is disabled and bidirectional control circuit 660 is enabled. Those of skill in the art will appreciate that in some embodiments, unidirectional control circuit 620 and bidirectional control circuit 660 could be implemented as a single circuit.

A signal on data output pin 113 is coupled to data input terminal D of D-type flip-flop 650 and to output terminal 681 of buffer 680. The signal on reset pin 114 drives clock input terminal 652 of D-type flip-flop 650. Thus, when the reset signal goes inactive, i.e., has an edge from an active state to an inactive state, the edge causes D-type flip-flip 650 to store the data line type selection signal on data output pin 113. Consequently, the data line type selection signal on data output pin 113 when the reset signal was active is produced on output terminal Q of D-type flip-flop 650 after the reset signal is inactive.

Output terminal Q of D-type flip-flop 650 is connected to data line type signal line 655 which in turn is connected to input select terminal 634 of multiplexer/demultiplexer 630, data line type input lead 626, and data line type input lead 666. Thus, the signal level on data line type signal line 655 selects either unidirectional control circuit 620 or bidirectional control circuit 660 and couples the selected circuit to control pins 111.

Internal data out input terminal 117 is connected to a three-state buffer 680 that in turn is connected to data output pin 113. During reset unidirectional control circuit 620 disables three-state buffer 680 by driving output enable input terminal 683 to an inactive state. Furthermore, if the signal on data line type signal line 655 is in the second state, signifying bidirectional mode, unidirectional control circuit 620 also disables three state buffer 680. Conversely, when the signal on data line type signal line 655 has the first state, signifying unidirectional mode, unidirectional control circuit 620 enables three state buffer 680 so that internal data out input terminal 117 is coupled to data output pin 113.

Incoming data on data input pin 112 is passed to internal data in output terminal 115 through buffer 640. In bidirectional mode, data input pin 112 is also used for outputting data. Therefore, data out input terminal 117 is coupled to data input pin 112 through three-state buffer 670. In bidirectional mode, bidirectional control circuit 660 enables three-state buffer 670 on output enable lead 673, when data is going to bidirectional circuit 160. If data is coming from bidirectional circuit 160, bidirectional control circuit 660 disables three-state buffer 670. In unidirectional mode, three-state buffer 670 is always disabled.

In the various embodiments of this invention, a method and structure has been described that eliminates the shortcomings of the prior art which required additional pins to allow a circuit to function with multiple data line types. The use of a data pin during reset to provide information regarding external connections to a circuit allows circuits to be designed to interface with multiple external connections without being limited by the number of available pins.

The various embodiments described herein are illustrative only of the principles of this invention and are not intended to limit the invention to the particular implementations described. Those skilled in the art will be able to use the principles of this invention in any application which requires data to be given to a circuit during reset. Furthermore, those skilled in the art using the principles of this invention can develop different implementations of the various circuits described.

I claim:

1. A method of determining whether a bidirectional data line circuit or a unidirectional data line circuit is connected to an interface circuit having a plurality of leads wherein said plurality of leads are used during operation of said interface circuit for a function other than determining whether said bidirectional data line circuit or said unidirectional data line circuit is connected to said interface circuit, said method comprising:

generating a first logic level on one lead in said plurality of leads if said bidirectional circuit is connected to said interface circuit;

generating a second logic level on said one lead in said plurality of leads if said unidirectional circuit is connected to said interface circuit; and reading a data line type on said one lead in said plurality of leads after a reset signal thereby utilizing said one lead for both said function other than determining whether said bidirectional data line circuit or said unidirectional data line circuit is connected to said interface circuit, and for determining whether said bidirectional data line circuit or said unidirectional data line circuit is connected to said interface circuit.

2. The method of claim 1, wherein said first logic level is logic low and said second logic level is logic high.

3. The method of claim 2, wherein said generating a first logic level comprises:

connecting a first lead of a resistor to said one lead in said plurality of leads; and connecting a second lead of said resistor to ground.

4. The method of claim 2, wherein said generating a second logic level comprises:

connecting a first lead of a resistor to said one lead in said plurality of leads; and connecting a second lead of said resistor to a supply voltage.

5. The method of claim 1, wherein said first logic level is logic high and said second logic level is logic low.

6. The method of claim 5, wherein said generating a first logic level comprises:

connecting a first lead of a resistor to said one lead in said plurality of leads; and connecting a second lead of said resistor to a supply voltage.

7. The method of claim 5, wherein said generating a second logic level comprises:

connecting a first lead of a resistor to said one lead in said plurality of leads; and connecting a second lead of said resistor to ground.

8. The method of claim 1, wherein said one lead in said plurality of leads is a data lead.

9. The method of claim 1, wherein said interface circuit is on a single chip.

10. The method of claim 3, wherein said interface circuit and said resistor are on a single chip.

* * * * *